United States Patent
Frank (10) Patent No.: US 8,683,135 B2
(45) Date of Patent: Mar. 25, 2014

(54) PREFETCH INSTRUCTION THAT IGNORES A CACHE HIT

(75) Inventor: Michael Frank, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 249 days.

(21) Appl. No.: 12/916,624

(22) Filed: Oct. 31, 2010

(65) Prior Publication Data

US 2012/0110269 A1     May 3, 2012

(51) Int. Cl.
*G06F 12/00*     (2006.01)

(52) U.S. Cl.
USPC ............. 711/137; 711/138; 711/E12.004; 711/E12.021

(58) Field of Classification Search
USPC ............. 711/137, 138, E12.004, E12.021
See application file for complete search history.

(56) References Cited

U.S. PATENT DOCUMENTS

| | | | |
|---|---|---|---|
| 6,128,703 A * | 10/2000 | Bourekas et al. | 711/138 |
| 6,282,617 B1 * | 8/2001 | Tirumala et al. | 711/133 |
| 6,460,115 B1 | 10/2002 | Kahle et al. | |
| 6,606,689 B1 | 8/2003 | Cheng et al. | |
| 7,023,445 B1 * | 4/2006 | Sell | 345/557 |
| 7,260,704 B2 | 8/2007 | Cooksey et al. | |
| 7,493,451 B2 | 2/2009 | Kadambi et al. | |
| 2004/0205286 A1 * | 10/2004 | Bryant et al. | 711/1 |
| 2005/0237329 A1 * | 10/2005 | Rubinstein et al. | 345/531 |
| 2005/0273752 A1 * | 12/2005 | Gutberlet et al. | 716/18 |
| 2006/0080553 A1 * | 4/2006 | Hall | 713/189 |

OTHER PUBLICATIONS

Arm Manual PLD Instruction: A8.6.117 PLD (immediate, literal) and A8.6.118 PLD (register), ARM Limited, ARM DDI 0406A, 1996-1998, 2000, 2004-2007, A8236-239.
ARM Architecture Reference Manual: ARMv7-A and ARMv7-R edition, ARM Limited, ARM DDI 0406A, 1996-1998, 2000, 2004-2007, 2 pages.
Extended European Search Report in Application No. 11186927.7 dated Oct. 16, 2012, 9 pages.
Partial European Search Report in Application No. 11186927.7 dated Jun. 28, 2012, 6 pages.
International Search Report and Written Opinion in Application No. PCT/US2011/057235 mailed Mar. 8, 2012, 8 pages.

* cited by examiner

*Primary Examiner* — Larry Mackall (57) ABSTRACT

Techniques are disclosed relating to prefetching data from memory. In one embodiment, an integrated circuit may include a processor containing an execution core and a data cache. The execution core may be configured to receive an instance of a prefetch instruction that specifies a memory address from which to retrieve data. In response to the instance of the instruction, the execution core retrieves data from the memory address and stores it in the data in the data cache, regardless of whether the data corresponding to that particular memory address is already stored in the data cache. In this manner, the data cache may be used as a prefetch buffer for data in memory buffers where coherence has not been maintained.

13 Claims, 5 Drawing Sheets

PREFETCH INSTRUCTION THAT IGNORES A CACHE HIT

BACKGROUND

1. Technical Field

This disclosure relates generally to processors, and, more specifically, to prefetching by processors.

2. Description of the Related Art

In various computer architectures, processing cores can typically perform operations on operands many times faster than such operands can be accessed from the memory hierarchy associated with the cores. To mitigate the effect of memory read latency, certain processor instruction set architectures (ISAs) include instructions that cause data to be retrieved from memory and stored locally in a cache if the cache does not already hold the data. For example, the "PLD" instruction in the ARM V7 ISA will cause data to be prefetched from memory and stored in the cache if the cache does not include a copy of data for that memory address. If the data is in the cache, however, execution of the PLD instruction will not cause a memory access for the data; instead the instruction is turned into a "no operation" (NOP).

In many systems that include a data cache, data flowing between processing blocks via shared memory is not checked against the data cache, and thus is not coherent. Accordingly, the shared memory is typically allocated from a pool of non-cacheable memory. The non-cacheability of this data, however, makes instructions such as the PLD instruction ineffective. The reduced ineffectiveness of such instructions is problematic, particularly in certain image processing applications that operate on a large number of pixels that are local relative to a given pixel.

SUMMARY

This disclosure describes techniques and structures that facilitate prefetching data from memory. In one embodiment, an execution core is configured to receive a prefetch instruction, which specifies a memory address in a memory from which to retrieve data. After receiving an instance of a prefetch instruction, the execution core may retrieve data from the specified memory address and store the data in a data cache, whether or not data corresponding to the specified memory address is already stored in the data cache. For example, upon receiving another instance of the prefetch instruction specifying a memory address for which the data cache already stores data, the execution core is configured to cause data to be retrieved from the specified memory address and reloaded in the data cache. In one embodiment, the execution core and data cache are located on a common integrated circuit, which may be a system on a chip.

In one particular configuration, an image signal processor may process an image captured by a camera and write the resulting image data to cacheable memory. An image processing algorithm executing on a processor may then retrieve the data from the memory, perform a sequence of operations, and then write the data back to memory. The data may then be further processed by an image scaler and a video encoder. By using a prefetch instruction according to the present disclosure, the data may always be loaded from memory, ignoring any cache hits. The use of this instruction thus permits prefetching to occur (using the cache as a prefetch buffer) while ensuring that old data from a previous image capture will be ignored.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

In the following discussion, a prefetch instruction is disclosed that is executable to load data from a specified memory address into a data cache, regardless of whether data corresponding to the memory address is already stored in the cache. The disclosure first describes an exemplary system (an SoC), followed by a description of the proposed prefetch instruction itself.

Figure 1:
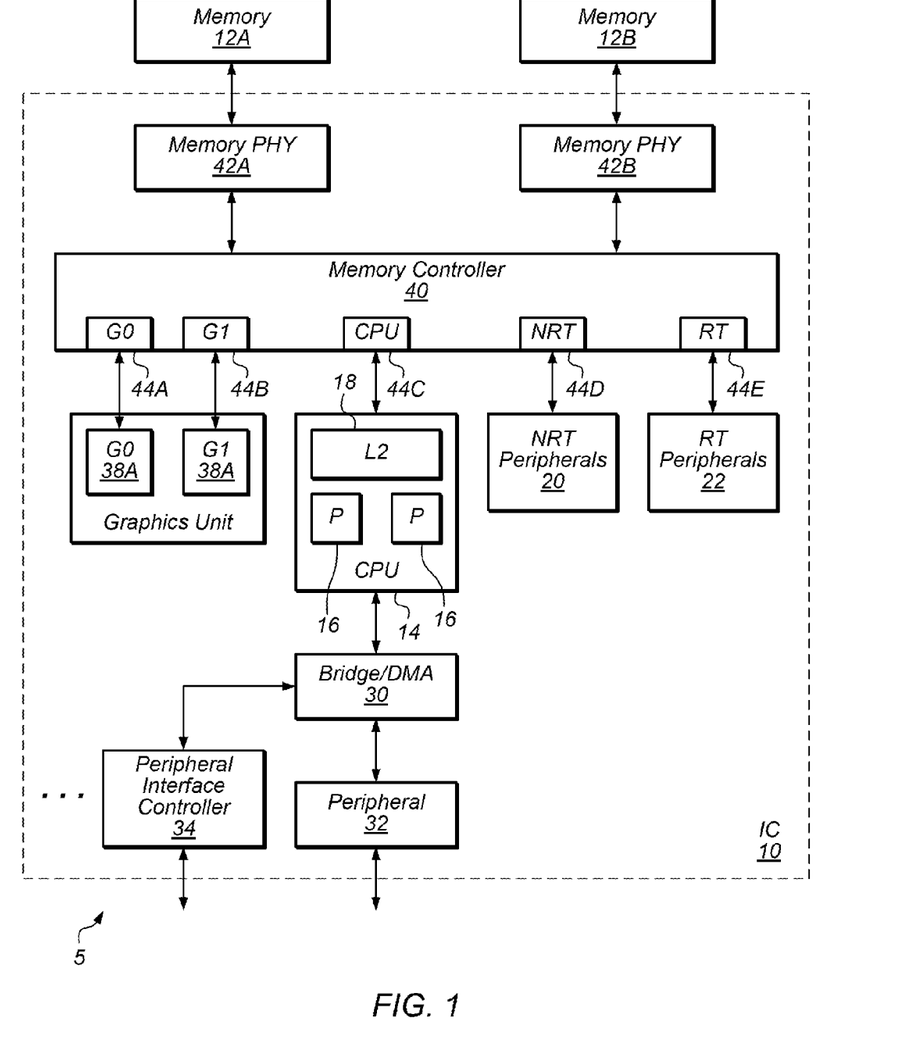
FIG. 1 is a block diagram illustrating one embodiment of an integrated circuit.

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 including one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. That is, there may be more or fewer ports than those shown in FIG. 1. The number of memory PHYs 42A-42B and corresponding memories 12A-12B may be one or more than two in other embodiments.

Generally, a port may be a communication point on the memory controller 40 that interfaces with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 may share the RT port 44E. Each port 44A-44E is coupled to an interface to communicate with its respective agent. The interface may be any type of communication medium (e.g. a bus, a point-to-point interconnect, etc.) and may implement any protocol. The interconnect between the memory controller and sources may also include any other desired interconnect such as meshes, network on a chip fabrics, shared buses, point-to-point interconnects, etc.

The processors 16 may implement any instruction set architecture (ISA), and may be configured to execute instructions defined in that instruction set architecture. (As used herein, an ISA refers to a specification of a set of instructions that are executable by a particular processor. A program for a particular processor thus includes instances of different instructions within its ISA.) The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may include circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a WiFi (IEEE 802.11b,g,n) controller. An audio unit including various audio processing devices may be included in the peripherals 32. One or more digital signal processors may be included in the peripherals 32. The peripherals 32 may include any other desired function such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
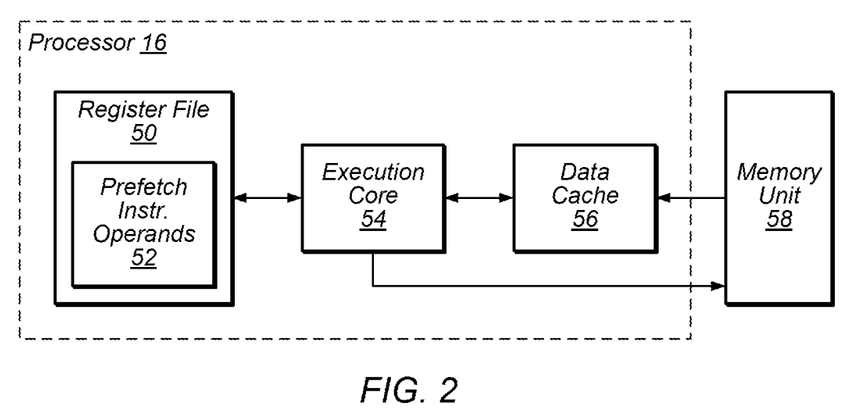
FIG. 2 is a block diagram of at least a portion of a processor shown in FIG. 1.

Turning now to FIG. 2, a block diagram of a portion of one embodiment of a processor 16 is shown. In the illustrated embodiment, processor 16 includes an execution core 54 that is coupled to register file 50, data cache 56, and memory unit 58.

In one embodiment, execution core 54 may be configured to execute an instance of a prefetch instruction. In response to the instance of the prefetch instruction, execution core 54 may prefetch a cache line of data addressed by the prefetch instruction from memory unit 58. Prefetching a cache line of data may include using a memory address from the prefetch instruction to retrieve data from the memory and store the retrieved data in data cache 56, whether or not data corresponding to that memory address is already stored in data cache 56. As used herein, data is said to "correspond to" a memory address if the data is within a cache line or other block of memory identified by the memory address. (An instruction may explicitly specify a memory address, or specify operands which can be used to compute the memory address.) For example, consider a scenario in which shared memory stores the value "0001" within a block of memory (e.g., a cache line-sized block) at address 1234. Further consider a scenario in which, as a result of a previous memory access to the same address, a data cache stores a different value (e.g., "0002") for the memory address 1234. Execution of an instance of the prefetch instruction of the present disclosure that specifies the address 1234 causes retrieval of the data from memory (i.e., 0001), even though the cache also includes data for (corresponding to) the same memory address.

The memory unit 58 may be any type of memory, such as those listed above. Additionally, the memory unit 58 may include one or more cacheable areas, such as cacheable image buffers. In one embodiment, execution core 54 does not need to check data cache 56 for the addressed line of data prior to fetching the data because the data will be stored in data cache 56 in any event.

Processor 16 may implement a variety of prefetch mechanisms, alone or in combination, to determine what data to prefetch. One example is an automated prefetch scheme, such as a branch prediction algorithm or a pattern-based prefetch engine. In other embodiments, processor 16 may use cache lines to buffer the data before it will be used, or processor 16 may use a dedicated prefetch buffer. The prefetch mechanism may be active in an invisible way, or it may be under direct program control with explicit instructions. Further, in some embodiments, the prefetch mechanism may be implemented by a component other than processor 16, such as a computer-readable storage medium, memory, or other component.

In some embodiments, execution core 54 may be configured to execute a standard prefetch instruction. In such an embodiment, execution core 54 checks data cache 56 for the addressed line of data prior to fetching the addressed data from memory unit 58.

In one embodiment, register file 50 may include prefetch instruction operand(s) 52, which may be used to generate an address of a cache line of data during execution of a prefetch instruction. In various embodiments, register file 50 may correspond to an architecturally-visible integer register file, an architecturally-visible floating-point register file, portions of both of these types of register files, or an alternatively addressed structure such as a set of memory-mapped registers, a defined set of memory locations, or a private (i.e., non-architecturally-visible) storage structure. Additionally, register file 50 may include integer registers, floating point registers, multimedia registers, etc. Register file 50 may be implemented in various fashions. For example, registers may be implemented as any sort of clocked storage devices such as flops, latches, etc. Registers may also be implemented as memory arrays, where a register address may be used to select an entry in the array. Any combination of implementations may be used in various embodiments of processor 16.

In one embodiment, data cache 56 may be non-coherent with one or more devices in system 5 of FIG. 1. In alternative embodiments, data cache 56 may be coherent with one or more devices in system 5 of FIG. 1.

Processor 16 may also use a different type of prefetch instruction in addition to the disclosed prefetch instruction. Processor 16, upon executing the different type of prefetch instruction, may prefetch a cache line of data, including using a memory address from the prefetch instruction to retrieve data from the memory and store the retrieved data in data cache 56, only if data corresponding to that memory address is not already stored in data cache 56. If the data cache 56 already contains data corresponding to that memory address, processor 16 executes a NOP. As used herein, a "NOP" is an instruction or a portion of an instruction that performs an operation that essentially has no effect. Its execution may use one or more clock cycles. In scenarios where a large number of pixels of an image are being processed by processor 16, the cost of checking every transaction for cache coherency is high, both in terms of hardware and power required. As a result, shared image buffers in memory unit 58 may not be coherent to data cache 56. Where the shared image buffers are not coherent to data cache 56, stale data may be present from a previous frame. In such a scenario, data cache 56 may be flushed between frames to clear the stale data. However, the cost of flushing the cache may increase data load latency and therefore decrease performance, almost offsetting the gain in performance from using the different type of prefetch instruction. This example further highlights one advantage of using the disclosed prefetch instruction. By utilizing the disclosed prefetch instruction in which data is prefetched even when data corresponding to that memory address is already stored in data cache 56, stale data will not be present from a previous frame thus eliminating the need to flush data cache 56 between frames. Further, in the above described scenario, the disclosed prefetch instruction does not waste clock cycles by executing a NOP.

In one embodiment, processor 16 may implement a single type of prefetch instruction that changes behavior, dependent on a bit in the page descriptor, to implement both the disclosed prefetch instruction and the different type of prefetch instruction in the above paragraph. Setting the bit in the page descriptor may, in some examples, cause the prefetch instruction to ignore the current cache contents. By ignoring the current cache contents, the single instruction may cause execution core 54 to retrieve data from the memory and store the retrieved data in data cache 56, whether or not data corresponding to that memory address is already stored in data cache 56. If the bit in the page descriptor is not set, execution core 54 will retrieve data from the memory and store the retrieved data in data cache 56 only if data corresponding to that memory address is not already stored in data cache 56.

It is noted that, while one embodiment of the processor 16 may be implemented in the integrated circuit 10 as shown in FIG. 1, other embodiments may implement the processor 16 as a discrete component. Additionally, the illustrated partitioning of resources is merely one example of how processor 16 may be implemented.

Figure 3:
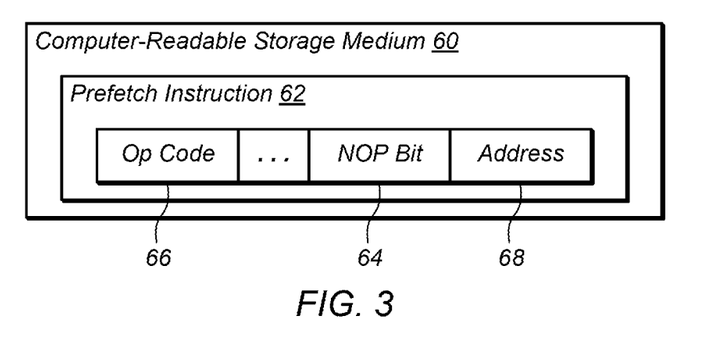
FIG. 3 is a block diagram of one embodiment of an exemplary computer-readable storage medium.

FIG. 3 illustrates a computer-readable storage medium 60. Computer-readable storage medium 60 is one embodiment of an article of manufacture that stores instructions that are executable by a system 5 that includes processor 16. In the illustrated embodiment, computer-readable storage medium 60 includes an instance of prefetch instruction 62. As shown in FIG. 3, instance 62 may contain a NOP bit 64 that, when logically high, performs a no operation (NOP) and, when logically low, performs the instruction. In one embodiment, an instance of the disclosed prefetch instruction includes a NOP bit that is logically low. In another embodiment, an instance of the disclosed prefetch instruction lacks a NOP bit. In either of the aforementioned embodiments, the prefetch instruction is performed. Instance 62 may also contain an opcode 66 that differentiates the disclosed prefetch instruction from other instructions in the instruction set architecture implemented by processor 16. Additionally, instance 62 may include an address 68. The particular form of instruction 62 shown is exemplary and that other arrangements of instructions than those shown are possible. For example, computer-readable storage medium 60 may include other types of instructions such as committing store instructions, non-memory access instructions, etc.

In some embodiments, a computer-readable storage medium can be used to store instructions read by a program and used, directly or indirectly, to fabricate hardware for processor 16 described above. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may include a set of gates (e.g., defined in a synthesis library), which represent the functionality of processor 16. The netlist may then be placed and routed to produce a data set describing geometric shapes to be applied to masks. The masks may then be used in various semiconductor fabrication steps to produce a semiconductor circuit or circuits corresponding to processor 16.

Computer-readable storage medium 60 refers to any of a variety of tangible, non-transitory media that store program instructions and/or data used during execution. In one embodiment, computer-storage readable medium 60 may include various portions of the memory subsystem. In other embodiments, computer-readable storage medium 60 may include storage media or memory media of a peripheral storage device such as magnetic (e.g., disk) or optical media (e.g., CD, DVD, and related technologies, etc.). Computer-readable storage medium 60 may be either volatile or nonvolatile memory. For example, computer-readable storage medium 60 may be (without limitation) FB-DIMM, DDR/DDR2/DDR3/DDR4 SDRAM, RDRAM®, flash memory, and of various types of ROM, etc.

Figure 4:
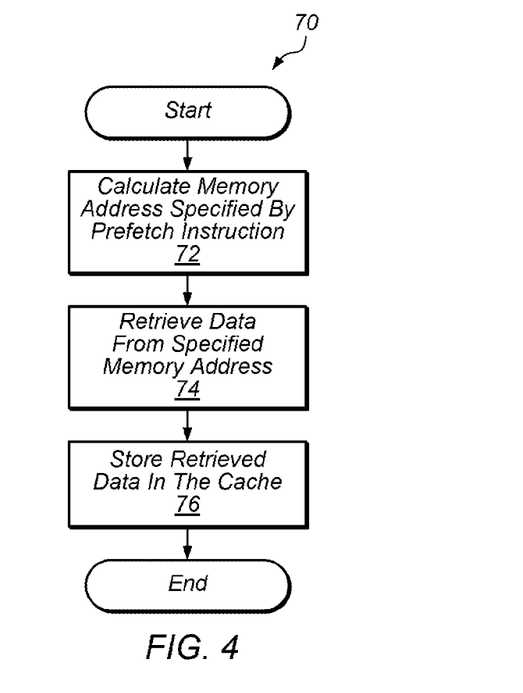
FIG. 4 is a flowchart illustrating one embodiment of a prefetch sequence.

Turning to FIG. 4, one embodiment of a method 70 for executing an instance of a prefetch instruction is shown. In one embodiment, processor 16 performs method 70 upon issuing an instance of a prefetch instruction. In some embodiments, method 70 may include additional (or fewer) steps than shown.

In step 72, processor 16 calculates a memory address specified by a prefetch instruction. In one embodiment, prefetch instruction operands 52 generate the address of a cache line of data during execution of the prefetch instruction. An instruction may explicitly specify a memory address, or specify operands which can be used to compute the memory address.

In step 74, processor 16 retrieves the addressed cache line of data from memory unit 58 and stores it in data cache 56, without regard to whether the data corresponding to the specified memory address is currently stored in data cache 56. In other embodiments, processor 16 may first check if data corresponding to the specified address is already stored in data cache 56 and, if so, processor 16 may perform a NOP and not retrieve the data.

In step 76, processor 16 stores the retrieved data in data cache 56 even if the data corresponding to the specified memory address is already in the cache. In one embodiment, processor 16 stores the data in data cache 56. If data cache 56 already contains the data corresponding to the specified address, processor 16 nevertheless stores that requested data in data cache 56.

The above steps may be initiated by a processor, processors, a CPU, a memory, a computer-readable storage medium or any combination thereof.

As noted above, certain situations may exist where large amounts of data must be processed and the cost of checking every transaction for cache coherency is too great. Yet, when portions of memory unit 58 are shared between different components, such as multiple processors 16, one consequence of non-coherency may be that one processor 16 may process stale data. Method 70 may be used such that cache coherency need not be checked, and at the same time, eliminate the possibility that a processor 16 processes stale data.

Figure 5:
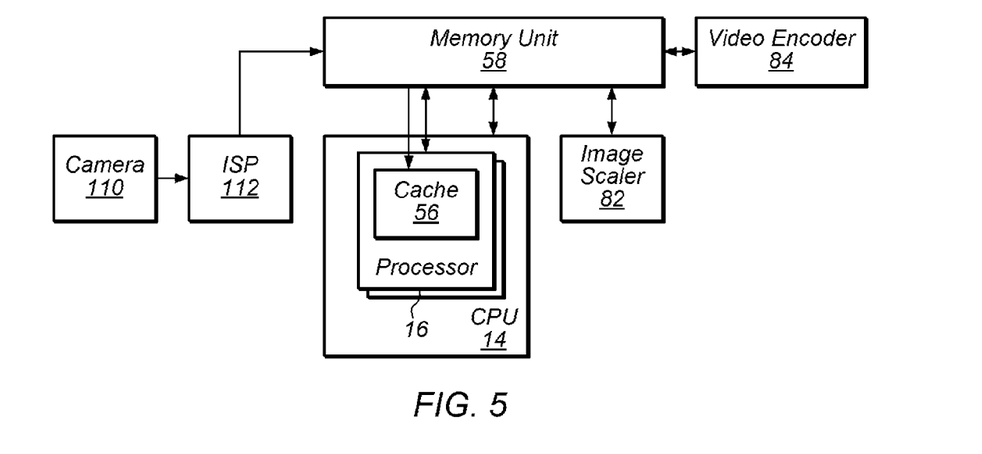
FIG. 5 is a block diagram illustrating one embodiment of a video application.

FIG. 5 illustrates one embodiment of a prefetch instruction in an exemplary video application. In the illustrated embodiment, memory unit 58 is coupled to image signal processor (ISP) 112, CPU 14, image scaler 82, and video encoder 84. ISP 112 is coupled to an image capturing device, such as camera 110. Camera 110 may capture an image, images, or video and pass the image data for processing in ISP 112. In the illustrated embodiment, CPU 14 includes two processors 16, each including a data cache 56.

In one embodiment, each of the two processors 16 may be configured to execute instances of a prefetch instruction. In response to the prefetch instruction, the processor 16 that receives the prefetch instruction prefetches a cache line of data, addressed by the prefetch instruction, from memory unit 58. Processor 16 ignores a cache hit by retrieving the addressed data from memory unit 58 and storing the data in its data cache 56, without regard to whether data corresponding to the specified memory address is currently stored in its data cache 56. In this illustration, processor 16 may not check its data cache 56 for the addressed line of data prior to fetching the data because the data will be stored in its data cache 56 in any event. In another embodiment, there are more than two processors 16 configured to execute a prefetch instruction.

In one embodiment, an image capturing device, such as camera 110, passes image data (bits) to ISP 112. ISP 112 may then write processed image data into cacheable image buffers in memory unit 58. The cacheable image buffers may be shared buffers among one or more components of system 5. ISP 112 may be a component of the camera 110 or it may be an external standalone image signal processor.

In some embodiments, CPU 14 includes a processor 16, including data cache 56. CPU 14 may include a second processor 16 while in other embodiments, CPU 14 may include more than two processors 16. Processor 16 may utilize the prefetch instruction, discussed above, which may prevent a scenario in which old data from a previous capture would remain in data cache 56. In other words, stale data may not remain in data cache 56 prior to further processing by CPU 14. Data cache 56 may be used as a prefetch buffer, which may help optimize execution by allowing loop-unrolling and prefetching data several iterations before the data is required by other processing functions. In one embodiment, CPU 14 receives the prefetched data from data cache 56. CPU 14 may execute instructions that perform a sequence of operations on the prefetched data. The sequence of operations may include executing a filtering algorithm, loop unrolling, and/or any other technique used to process data or speed up processing of that data. Processor 16 may also perform a sequence of operations on the prefetched data, either alone or in combination with any processing CPU 14 performed. After CPU 14 processes the data, the filtered or processed data may be written back to memory unit 58.

The filtered data, in some embodiments, is further processed by video circuitry, which may include an image scaler 82 or video encoder 84. Image scaler 82 may use one or more scaling methods including but not limited to: subsampling, replicative sampling, downsampling, upsampling, area mapping, mip-mapping, texture mapping, morphological transforms, isotropic scaling, anisotropic scaling, interpolation, filtering, or scaling the filtered data in any other fashion. Additionally, image scaling may be done with one or more algorithms.

In some embodiments, the filtered data is processed by video encoder 84. Video encoder 84 may be an H.264 encoder, other MPEG-4 encoders, or any extension of an H.264 encoder. It is noted that improvements in video encodings are constantly achieved and it is contemplated that other embodiments will implement the improved encoders.

In some embodiments, the processed data may be passed on to or read on one or more RT peripherals 22 of FIG. 1, such as a display pipe.

As noted above, the exemplary video application of FIG. 5 demonstrates one example of a scenario where the disclosed prefetch instruction may enable a gain in performance without the risk of processing stale data from an older frame. Here, the video application requires processing of image data, whether still images or video, from ISP 112. Image data may constitute a large amount of data. Because of the large amount of data, checking for cache coherency may be cost prohibitive. The system may include other components, in addition to or instead of ISP 112, that present the same cache coherency issue. For example, JPEG, MPEG or other image/data decompressors or decoders typically have large output buffers and write to memory while bypassing the coherency scheme of embedded processors. Utilizing the disclosed prefetch instruction without implementing a cache coherency protocol may provide a workaround for the lack of coherency, and at the same time eliminate the risk that stale data may be processed by processor 16.

Figure 6:
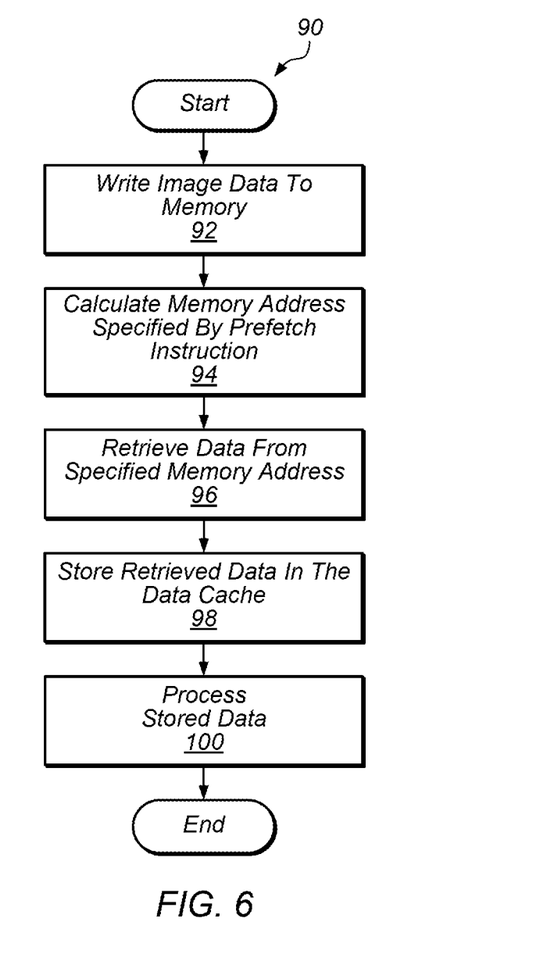
FIG. 6 is a flowchart illustrating operation of one embodiment of a video application.

Turning now to FIG. 6, a flowchart is shown illustrating operation of one embodiment of a method 90 in a video application. While the steps are shown in a particular order for ease of understanding in FIG. 6, other orders may be used. In one embodiment, processor 16 performs method 90 upon issuing an instance of a prefetch instruction. In some embodiments, method 90 may include additional (or fewer) steps than shown.

In step 92, ISP 112 writes image data to memory unit 58. The image data may come from camera 110, or some other image capturing device. The image data may be still image data or video data. In either case, the image data bits written to memory unit 58 constitute a large amount of data.

In step 94, processor 16 calculates a memory address specified by a prefetch instruction. In one embodiment, prefetch instruction operands 52 generate the address of a cache line of data during execution of the prefetch instruction. An instruction may explicitly specify a memory address, or specify operands which can be used to compute the memory address.

In step 96, processor 16 retrieves data from the specified memory address. In one embodiment, processor 16 retrieves the data from the specified address of memory unit 58, without regard to whether the data corresponding to that memory address is already in data cache 56. In other embodiments, processor 16 may first check if the data corresponding to that memory address is already in data cache 56, and if so, processor 16 may terminate the process and not retrieve the data. Or, processor 16 may retrieve the data but not store the data in data cache 56. Processor 16 may instead execute a NOP.

In step 98, processor 16 stores the retrieved data into data cache 56 even if the data corresponding to that address is already stored in data cache 56. In one embodiment, processor 16 stores the data in data cache 56. If data cache 56 already contains data corresponding to the specified memory address, processor 16 nevertheless stores data corresponding to that memory address in data cache 56.

In step 100, the stored data is processed. In one embodiment, CPU 14 performs a sequence of operations on the cached data. The sequence of operations may include any of the operations discussed above including video filtering and loop unrolling. In addition to or instead of CPU 14, processor 16 may perform the sequence of operations on the cached data. CPU 14 and/or processor 16 may write the processed data back to memory unit 58. In various embodiments, CPU 14 and/or processor 16 may write the processed data to the same memory location in memory unit 58 from which the prefetch instruction retrieved the data. The stored data may also be processed by image scaler 82, video encoder 84, or both. After processing, the data may be read on a display pipe or other RT peripheral 22.

In a typical SoC architecture, data flowing from one component to another, such as an image signal processor, is not checked against the cache for a variety of reasons. For example, the cost of checking every transaction for cache coherency may be great, in terms of hardware, performance, and power. Therefore, shared image buffers of memory are typically not coherent to the cache. Method 90 may avoid the lack of coherency issue described above by guaranteeing that old data in data cache 56 (e.g. from a previous capture) will be ignored. In addition, method 90 may provide performance and efficiency gains by allowing loop-unrolling and prefetching data several iterations before the data is required by any filtering or other algorithm.

Exemplary System

Figure 7:
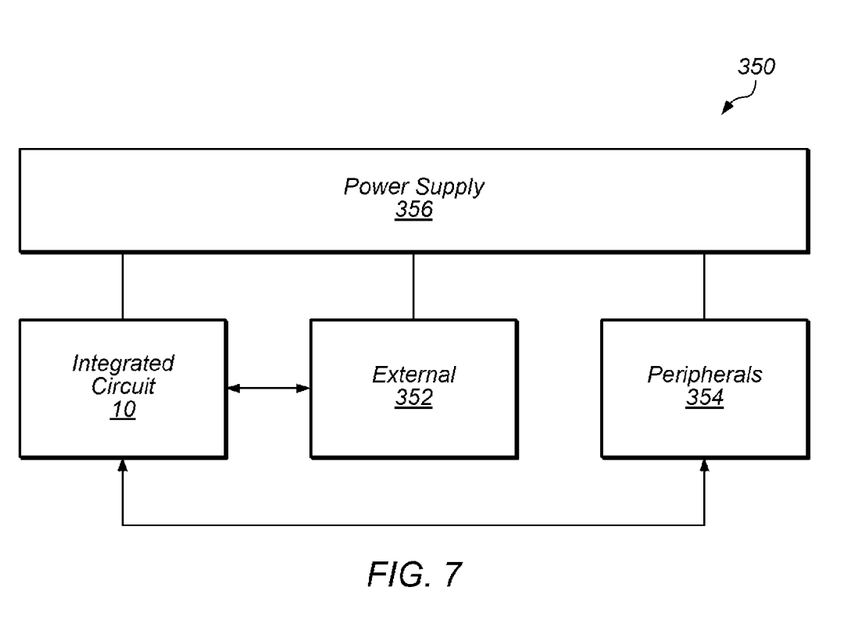
FIG. 7 is a block diagram illustrating one embodiment of an exemplary system.

Turning next to FIG. 7 is a block diagram of one embodiment of a system 350. In the illustrated embodiment, the system 350 includes at least one instance of an integrated circuit 10 coupled to an external memory 352. The external memory 352 may form the main memory subsystem discussed above with regard to FIG. 1 (e.g. the external memory 352 may include the memory 12A-12B). The integrated circuit 10 is coupled to one or more peripherals 354 and the external memory 352. A power supply 356 is also provided which supplies the supply voltages to the integrated circuit 358 as well as one or more supply voltages to the memory 352 and/or the peripherals 354. In some embodiments, more than one instance of the integrated circuit 10 may be included (and more than one external memory 352 may be included as well).

The memory 352 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 10 in a chip-on-chip configuration, a package-on-package configuration, or a multi-chip module configuration.

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Program instructions that are executed by computer systems (e.g., system 350) may be stored on various forms of computer readable storage media. Generally speaking, a computer readable storage medium may include any non-transitory/tangible storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a data cache;
    an execution core coupled to the data cache, wherein the execution core is configured to receive an instance of a first type of prefetch instruction that includes information usable to specify a memory address in a memory;
    an image signal processor coupled to the memory;
    a camera coupled to the image signal processor, wherein the camera is configured to provide image data to the image signal processor, wherein the image signal processor is configured to process the image data from the camera and is further configured to store the processed image data to the memory;
    wherein, in response to receiving the instance of the first type of prefetch instruction, the execution core is configured to use the memory address to retrieve the processed image data from the memory and store the retrieved image data in the data cache, whether or not data corresponding to that memory address is already stored in the data cache;

wherein the execution core is further configured to further process the retrieved data and store the further processed data back to the memory; and video circuitry configured to:
perform video operations on the further processed data resulting in video processed data, and
provide the video processed data for display;

wherein the data cache, the execution core, the image signal processor, the memory, the camera, and the video circuitry are part of a single device.

2. The apparatus of claim 1, wherein the instance of the first type of prefetch instruction specifies operands within a register file, wherein the operands are usable by the execution core to generate the memory address.

3. The apparatus of claim 1, wherein the retrieved processed image data is of a size corresponding to a cache line size of the data cache.

4. The apparatus of claim 1, wherein the execution core is configured to receive an instance of a second type of prefetch instruction that specifies a different memory address, wherein, in response to receiving the instance of the second type of prefetch instruction, the execution core is configured to use the different memory address to retrieve data from the memory only if data corresponding to the different memory address is not currently stored in the data cache, and wherein the first and second types of prefetch instructions are both specified within an instruction set architecture (ISA) associated with the execution core.

5. A system, comprising:
a memory;
an image signal processor coupled to the memory;
a camera coupled to the image signal processor, wherein the camera is configured to provide image data to the memory via the image signal processor, wherein the image signal processor is configured to process bits of the image data from the camera and store the processed bits of the image data to the memory;
one or more processors coupled to the memory, wherein at least one of the one or more processors includes a data cache, and wherein the at least one processor is configured, in response to executing an instance of an instruction specifying a memory address, to ignore a hit in its data cache on the memory address and prefetch the processed bits of the image data from the memory,
wherein the at least one processor is further configured to execute a filtering algorithm to further process the prefetched processed bits of the image data and write the further processed image data back to the memory; and
video circuitry configured to:
perform video operations on the further processed image data stored in memory, and
provide the further processed image data upon which video operations are performed for display;
wherein the memory, the image signal processor, the camera, the one or more processors, and the video circuitry are part of a single device.

6. The system of claim 5, wherein each of the one or more processors is configured to execute an instance of the instruction without implementing a cache coherency protocol.

7. The system of claim 5, wherein
a second of the one or more processors is configured, in response to executing a second instance of the instruction specifying the memory address, to ignore a hit in its data cache on the memory address and prefetch, from the memory, the data processed by the video circuitry, wherein the second processor is configured to execute the filtering algorithm on the data prefetched by the second processor, and wherein the second processor is configured to write the data resulting from the filtering algorithm performed by the second processor to the memory at the memory address; and wherein the first processor is configured, in response to executing a third instance of the instruction specifying the memory address, to ignore a hit in its data cache on the memory address and prefetch data from the memory at the memory address.

8. A method, comprising:
a camera of a device providing data to an image signal processor of the device;
the image signal processor of the device processing the data resulting in first processed data;
the image signal processor providing the first processed data to a memory of the device;
a first processor of the device issuing a first instance of a prefetch instruction;
the first processor executing the first instance of the prefetch instruction, including:
determining that a memory address, from the memory, specified by the first instance of the prefetch instruction causes a hit in a data cache of the first processor;
ignoring the hit in the data cache,
causing retrieval of the first processed data for the memory address from the memory, and
storing the retrieved data in the data cache;
the first processor performing a sequence of operations on the cached data to generate second processed data;
the first processor storing the second processed data into the memory;
a video encoder of the device performing video operations on the second processed data resulting in third processed data; and
the video encoder providing the third processed data for display;
wherein the camera, the image signal processor, the memory, the first processor, and the video circuitry are part of a same device.

9. The method of claim 8, wherein the data stored in the data cache of the first processor for the memory address is different from the retrieved data for the memory address.

10. The method of claim 8, further comprising:
a second processor of the device issuing a second instance of the prefetch instruction,
wherein the second instance specifies the memory address; and
the second processor executing the second instance of the prefetch instruction, including:
determining that the memory address causes a hit in a data cache of the second processor,
ignoring the hit in the data cache of the second processor,
causing retrieval of data for the memory address from the memory, and
storing the retrieved data in the data cache of the second processor.

11. The method of claim 8, further comprising:
the first processor issuing a first instance of a second type of a prefetch instruction; and
the first processor executing the first instance of the second type of prefetch instruction, including:
in response to determining that a second memory address specified by the first instance of the second type of prefetch instruction causes a hit in a data cache of the first processor, performing the first instance of the second type of prefetch instruction as a no operation (NOP).

12. The method of claim 11, further comprising:

the first processor issuing a second instance of a second type of a prefetch instruction; and the first processor executing the second instance of the second type of prefetch instruction, including:

in response to determining that a third memory address specified by the second instance of the second type of prefetch instruction misses in the data cache of the first processor, causing retrieval of data for the third memory address from a memory and storing the retrieved data for the third memory address in the data cache.

13. The method of claim 8, wherein the sequence of operations includes video filtering and loop unrolling.

* * * * *